US009344255B2

United States Patent
Son et al.

(10) Patent No.: US 9,344,255 B2
(45) Date of Patent: May 17, 2016

(54) METHOD AND APPARATUS FOR MITIGATING INTERFERENCE IN WIRELESS COMMUNICATION SYSTEM

(75) Inventors: Hyukmin Son, Anyang-si (KR); Hyunwoo Lee, Anyang-si (KR); Hyeyoung Choi, Anyang-si (KR); Seunghee Han, Anyang-si (KR); Jinmin Kim, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 137 days.

(21) Appl. No.: 14/131,416

(22) PCT Filed: Jul. 26, 2012

(86) PCT No.: PCT/KR2012/005961
§ 371 (c)(1),
(2), (4) Date: Jan. 7, 2014

(87) PCT Pub. No.: WO2013/015625
PCT Pub. Date: Jan. 31, 2013

(65) Prior Publication Data
US 2014/0140297 A1    May 22, 2014

Related U.S. Application Data

(60) Provisional application No. 61/511,567, filed on Jul. 26, 2011, provisional application No. 61/522,222, filed on Aug. 10, 2011.

(51) Int. Cl.
*H04J 11/00* (2006.01)
*H04L 5/00* (2006.01)

(52) U.S. Cl.
CPC ............. *H04L 5/0062* (2013.01); *H04J 11/003* (2013.01); *H04J 11/0056* (2013.01); *H04L 5/0073* (2013.01)

(58) Field of Classification Search
None
See application file for complete search history.

(56) References Cited

U.S. PATENT DOCUMENTS

| | | | |
|---|---|---|---|
| 2009/0252077 A1 | 10/2009 | Khandekar et al. | |
| 2011/0116437 A1 | 5/2011 | Chen et al. | |
| 2011/0149894 A1 | 6/2011 | Luo et al. | |
| 2011/0280223 A1* | 11/2011 | Maeda et al. | 370/335 |
| 2012/0113843 A1* | 5/2012 | Watfa et al. | 370/252 |

FOREIGN PATENT DOCUMENTS

WO    WO 2010087172 A1 *   8/2010

OTHER PUBLICATIONS

Ericsson, et al., "On Macro-Femto interference handling," 3GPP TSG-RAN WG1 #63, R1-106387, Nov. 2010, 5 pages.
(Continued)

*Primary Examiner* — Hoon J Chung
*Assistant Examiner* — Yaotang Wang
(74) *Attorney, Agent, or Firm* — Lee, Hong, Degerman, Kang & Waimey

(57) ABSTRACT

A method for mitigating interference in a wireless communication system includes a first transmission point determining the number of subframes that need to be shifted at a second transmission point using information from the second transmission point for an ABS configuration, wherein the ABS configuration is for a UE belonging to a third transmission point.

14 Claims, 13 Drawing Sheets

(56) References Cited

OTHER PUBLICATIONS

Motorola, "Discussion of time domain eICIC scheme for Rel-10," 3GPP TSG RAN WG1 Meeting #62bis, R1-105622, Oct. 2010, 6 pages.

PCT International Application No. PCT/KR2012/005961, Notification of Transmittal of the International Search Report and the Written Opinion of the International Searching Authority, or Declaration dated Jan. 30, 2013, 9 pages.

* cited by examiner

MeNB : macro eNodeB
PeNB : pico eNodeB
FeNB : femto eNodeB

MUE : macro UE
PUE : pico UE
FUE : femto eNodeB

FIG. 9
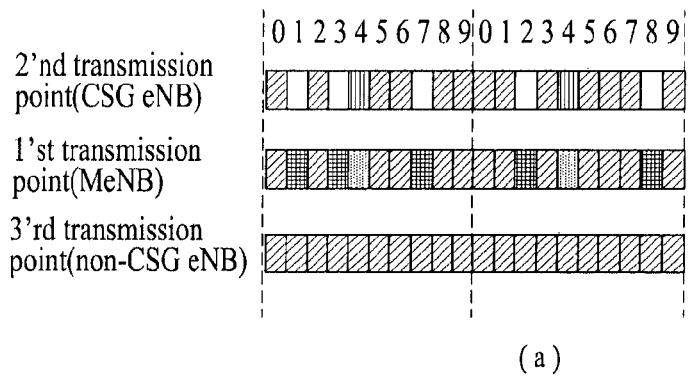
(a)
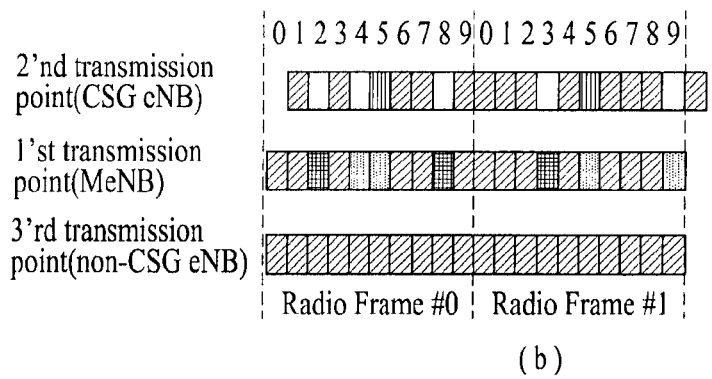
(b)
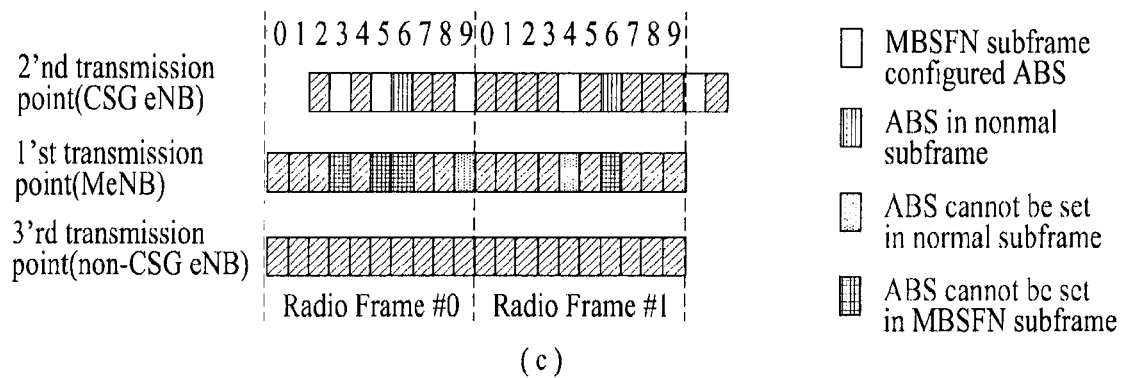
(c)

METHOD AND APPARATUS FOR MITIGATING INTERFERENCE IN WIRELESS COMMUNICATION SYSTEM

CROSS-REFERENCE TO RELATED APPLICATIONS

This application is the National Stage filing under 35 U.S.C. 371 of International Application No. PCT/KR2012/005961, filed on Jul. 26, 2012, which claims the benefit of U.S. Provisional Application Ser. Nos. 61/511,567, filed on Jul. 26, 2011, and 61/522,222, filed on Aug. 10, 2011, the contents of which are all hereby incorporated by reference herein in their entirety.

TECHNICAL FIELD

The present invention relates to a wireless communication system and, more particularly, to a method and apparatus for mitigating interference in a wireless communication system.

BACKGROUND ART

Extensive research has been conducted to provide various types of communication services including voice and data services in wireless communication systems. In general, a wireless communication system is a multiple access system that supports communication with multiple users by sharing available system resources (e.g. bandwidth, transmit power, etc.) among the multiple users. The multiple access system may adopt a multiple access scheme such as Code Division Multiple Access (CDMA), Frequency Division Multiple Access (FDMA), Time Division Multiple Access (TDMA), Orthogonal Frequency Division Multiple Access (OFDMA), Single Carrier Frequency Division Multiple Access (SC-FDMA), etc.

DISCLOSURE

Technical Problem

An object of the present invention is to provide a method and apparatus for mitigating interference between transmitted and received signals through configuration of an almost blank subframe (ABS) between transport points and shift of one or more subframes in a heterogeneous network environment.

It will be appreciated by persons skilled in the art that the objects that can be achieved with the present invention are not limited to what has been particularly described hereinabove and the above and other objects that the present invention can achieve will be more clearly understood from the following detailed description taken in conjunction with the accompanying drawings.

Technical Solution

The object of the present invention can be achieved by providing A method for mitigating interference in a wireless communication system, the method comprising: determining, by a first transmission point, the number of subframes that need to be shifted at a second transmission point using information from the second transmission point for an ABS (Almost Blank Subframe) configuration, wherein the ABS configuration is for a UE belonging to a third transmission point.

In another aspect of the present invention, A method for mitigating interference in a wireless communication system, the method comprising: transmitting information for ABS configuration of a first transmission point to the first transmission point; and receiving the number of subframes that need to be shifted at a second transmission point from the first transmission point, wherein the ABS configuration of the first transmission point is for a UE belonging to a third transmission point.

In another aspect of the present invention, A first transmission point apparatus in a wireless communication system, comprising: a transmission module; and a processor, wherein the processor determines the number of subframes that need to be shifted at a second transmission point using information from the second transmission point for an ABS configuration, wherein the ABS configuration is for a UE belonging to a third transmission point.

In another aspect of the present invention, A second transmission point apparatus in a wireless communication system, comprising: a transmission module; and a processor, wherein the processor transmits information for ABS configuration of a first transmission point to the first transmission point and receive the number of subframes that need to be shifted at a second transmission point from the first transmission point, wherein the ABS configuration of the first transmission point is for a UE belonging to a third transmission point.

The number of subframes is determined such that the number of subframes that can be set to ABSs by the first transmission point is being maximized in consideration of subframes set to ABSs by the second transmission point.

The number of subframes is determined by considering subframes for system information and synchronization signal transmission.

The above method further comprising: scheduling, by the first transmission point, one or more UEs to subframes corresponding to ABSs set by the second transmission point.

The information from the second transmission point includes ABS configuration information of the second transmission point.

The ABS configuration information of the second transmission point is transmitted in the form of a bitmap.

The information from the second transmission point includes ABS configuration information of the second transmission point and a recommended shift value.

The recommended shift value includes at least one of an upper limit or lower limit in units of the number of subframes.

The above method further comprising: transmitting the determined number of subframes to the second transmission point.

The ABS configuration of the second transmission point lasts for a predetermined time.

The first transmission point is a macro eNB and the second transmission point is a closed access subscriber group (CSG) eNB, and the third transmission point is a non-CSG eNB.

Advantageous Effects

According to embodiments of the present invention, it is possible to efficiently mitigate interference between transmitted and received signals in a heterogeneous network environment.

It will be appreciated by persons skilled in the art that that the effects that can be achieved with the present invention are not limited to what has been particularly described hereinabove and other advantages of the present invention will be more clearly understood from the following detailed description taken in conjunction with the accompanying drawings.

DESCRIPTION OF DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIG. 9 is a diagram illustrating mitigation of interference through subframe-based shift according to an embodiment of the present invention;

BEST MODE

Figure 1:
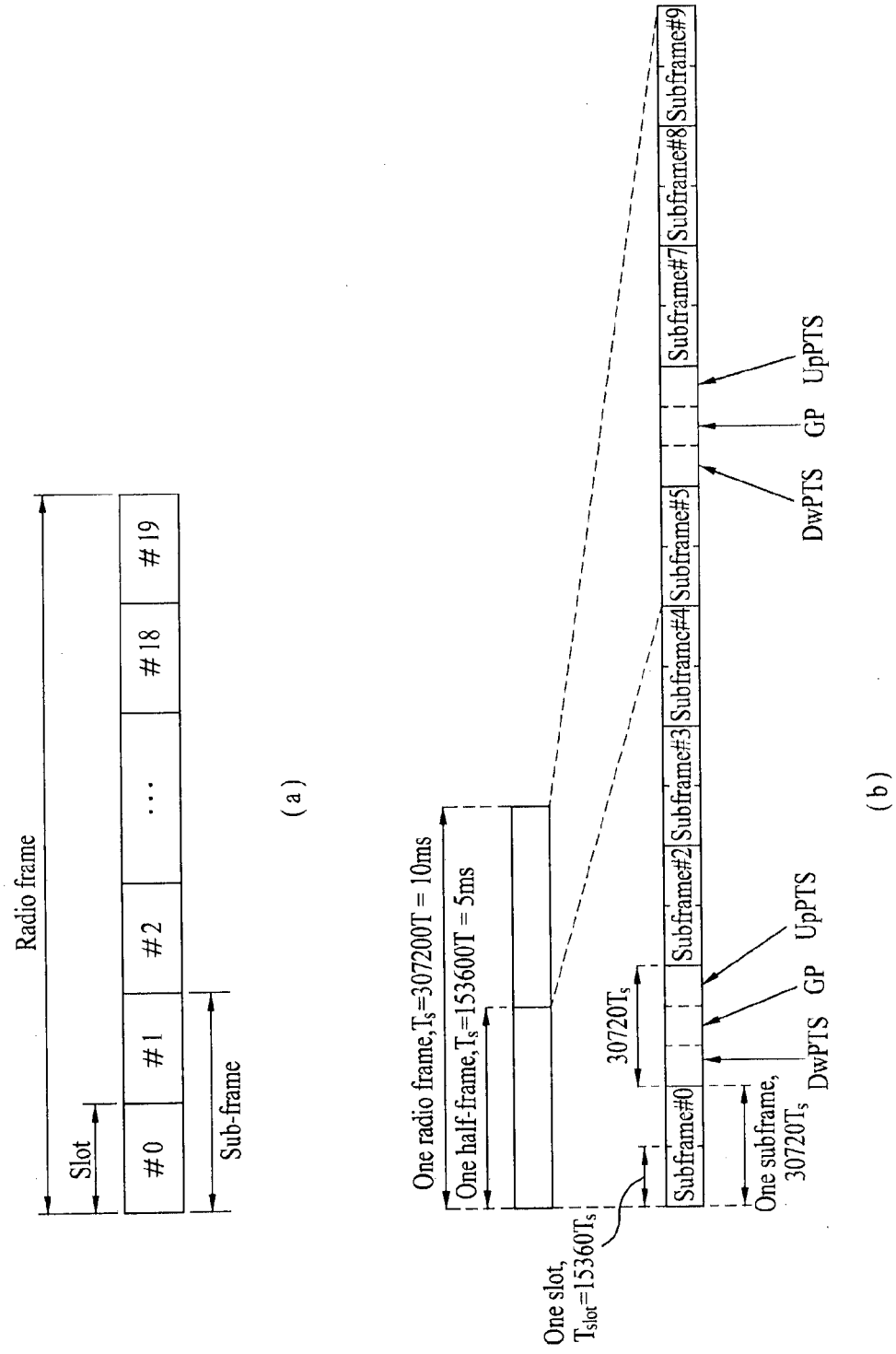
FIG. 1 illustrates a radio frame structure.

Embodiments described hereinbelow are combinations of elements and features of the present invention. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions of any one embodiment may be included in another embodiment and may be replaced with corresponding constructions of another embodiment.

In the embodiments of the present invention, a description is made, centering on a data transmission and reception relationship between an eNB and a user equipment (UE). The eNB is a terminal node of a network, which communicates directly with a UE. In some cases, a specific operation described as performed by the eNB may be performed by an upper node of the BS.

Namely, it is apparent that, in a network comprised of a plurality of network nodes including an eNB, various operations performed for communication with a UE may be performed by the eNB, or network nodes other than the eNB. The term 'base station (BS)' may be replaced with the term 'fixed station', 'Node B', 'evolved Node B (eNode B or eNB)', 'Access Point (AP)', etc. The term 'UE' may be replaced with the term 'terminal', 'Mobile Station (MS)', 'Mobile Subscriber Station (MSS)', 'Subscriber Station (SS)', etc.

Specific terms used for the embodiments of the present invention are provided to help the understanding of the present invention. These specific terms may be replaced with other terms within the scope and spirit of the present invention.

In some cases, to prevent the concept of the present invention from being ambiguous, structures and apparatuses of the known art will be omitted, or will be shown in the form of a block diagram based on main functions of each structure and apparatus. Also, wherever possible, the same reference numbers will be used throughout the drawings and the specification to refer to the same or like parts.

The embodiments of the present invention can be supported by standard documents disclosed for at least one of wireless access systems, Institute of Electrical and Electronics Engineers (IEEE) 802, $3^{rd}$ Generation Partnership Project (3GPP), 3GPP Long Term Evolution (3GPP LTE), LTE-Advanced (LTE-A), and 3GPP2. Steps or parts that are not described to clarify the technical features of the present invention can be supported by those documents. Further, all terms as set forth herein can be explained by the standard documents.

Techniques described herein can be used in various wireless access systems such as Code Division Multiple Access (CDMA), Frequency Division Multiple Access (FDMA), Time Division Multiple Access (TDMA), Orthogonal Frequency Division Multiple Access (OFDMA), Single Carrier-Frequency Division Multiple Access (SC-FDMA), etc. CDMA may be implemented as a radio technology such as Universal Terrestrial Radio Access (UTRA) or CDMA2000. TDMA may be implemented as a radio technology such as Global System for Mobile communications (GSM)/General Packet Radio Service (GPRS)/Enhanced Data Rates for GSM Evolution (EDGE). OFDMA may be implemented as a radio technology such as IEEE 802.11 (Wi-Fi), IEEE 802.16 (WiMAX), IEEE 802.20, Evolved-UTRA (E-UTRA) etc. UTRA is a part of Universal Mobile Telecommunication System (UMTS). 3GPP LTE is a part of Evolved UMTS (E-UMTS) using E-UTRA. 3GPP LTE employs OFDMA for downlink and SC-FDMA for uplink. LTE-A is an evolution of 3GPP LTE. WiMAX can be described by the IEEE 802.16e standard (Wireless Metropolitan Area Network (WirelessMAN-OFDMA Reference System) and the IEEE 802.16m standard (WirelessMAN-OFDMA Advanced System). For clarity, this application focuses on the 3GPP LTE/LTE-A system. However, the technical features of the present invention are not limited thereto.

A radio frame structure will now be described with reference to FIG. 1.

In a cellular OFDM wireless packet communication system, uplink/downlink data packet transmission is performed on a subframe basis, and a subframe is defined as a predetermined time interval including a plurality of OFDM symbols. 3GPP LTE supports type-1 radio frame structure applicable to frequency division duplex (FDD) and type-2 radio frame structure applicable to time division duplex (TDD).

FIG. 1(a) illustrates the type-1 radio frame structure. Referring to FIG. 1(a), one radio frame may be divided into 10 subframes, each subframe including two slots in the time domain. The transmission time of one subframe is defined as a transmission time interval (TTI). For example, one subframe may be 1 ms long and one slot may be 0.5 ms long. One slot may include a plurality of OFDM symbols in the time domain and include a plurality of resource blocks (RBs) in the frequency domain. Because the 3GPP LTE system uses orthogonal frequency division multiple access (OFDMA) for downlink, an OFDM symbol may represent one symbol period. An OFDM symbol may be regarded as a single carrier-frequency division multiple access (SC-FDMA) symbol or symbol period for uplink. A Resource Block (RB) is a resource allocation unit including a plurality of contiguous subcarriers in one slot.

The number of OFDM symbols included in one slot may vary according to cyclic prefix (CP) configuration. CP includes normal CP and extended CP. For example, the number of OFDM symbols included in a slot may be 7 in a normal CP case. When OFDM symbols are configured according to the extended CP, the length of an OFDM symbol increases and thus the number of OFDM symbols included in a slot is smaller than the number of OFDM symbols included in a slot in the normal CP case. For example, the number of OFDM symbols included in a slot may be 6 in an extended CP case. When a channel state is unstable, for example, when a UE rapidly moves, the extended CP may be used to further mitigate inter-symbol interference.

Since one slot includes 7 OFDM symbols in the normal CP case, one subframe includes 14 OFDM symbols. Here, 2 or 3 OFDM symbols at the start of a subframe may be allocated to a physical downlink control channel (PDCCH) and the other OFDM symbols may be allocated to a physical downlink shared channel (PDSCH).

FIG. 1(b) illustrates the type-2 radio frame structure. The type-2 radio frame includes two half frames each having 5 subframes, a downlink pilot time slot (DwPTS), a guard period (GP), and an uplink pilot time slot (UpPTS). Each subframe includes two slots. The DwPTS is used for initial cell search, synchronization, or channel estimation in a UE, whereas the UpPTS is used for channel estimation in an eNB and uplink transmission synchronization in a UE. The GP is a period between downlink and uplink, for eliminating interference with the uplink caused by multi-path delay of a downlink signal. One subframe includes 2 slots irrespective of radio frame type.

The aforementioned radio frame structure is purely exemplary and thus the number of subframes included in a radio frame, the number of slots included in a subframe, or the number of symbols included in a slot may vary.

Figure 2:
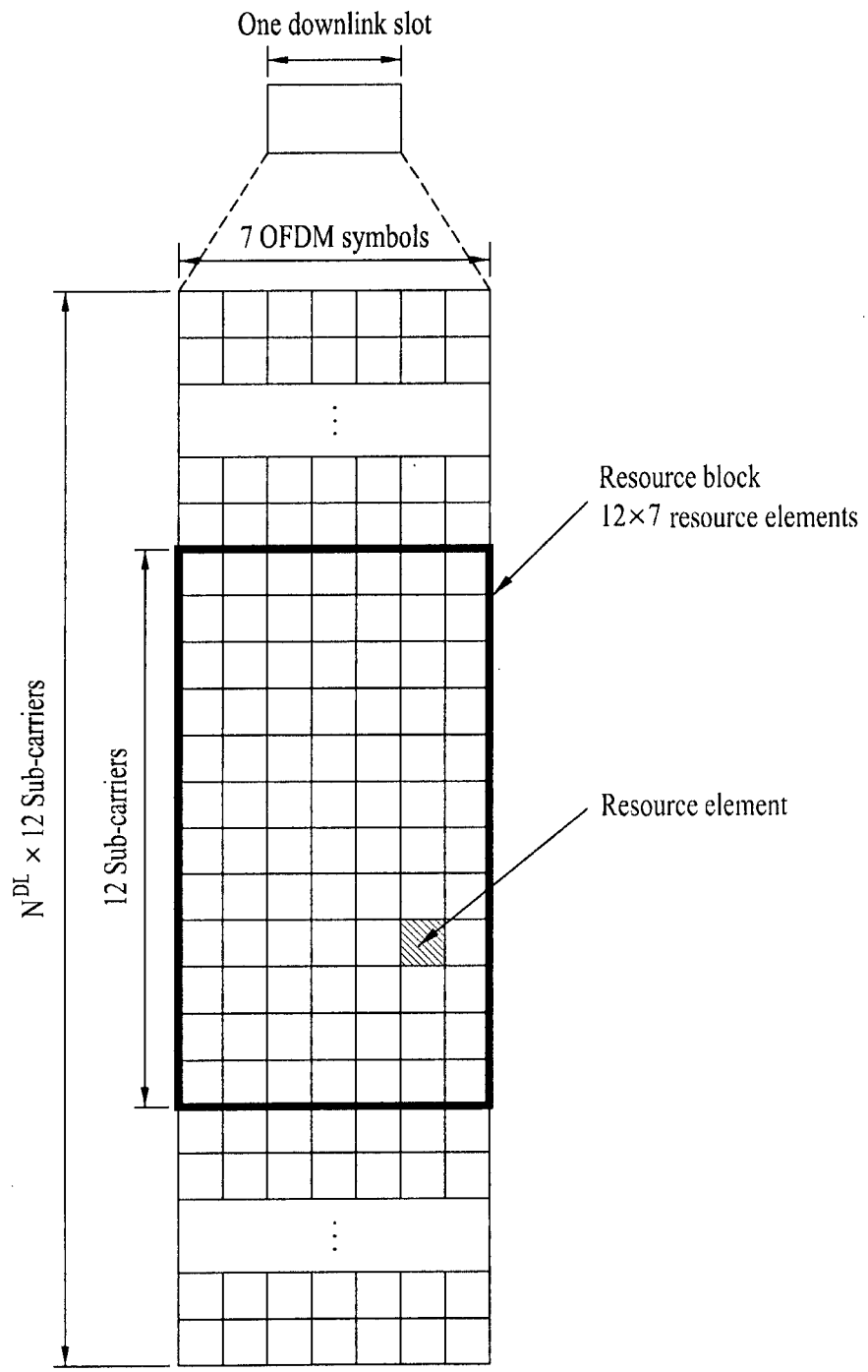
FIG. 2 illustrates a resource grid in a downlink slot.

FIG. 2 illustrates a resource grid in a downlink slot. While FIG. 2 shows that a downlink slot includes 7 OFDM symbols in the time domain and each RB has 12 subcarriers in the frequency domain, the present invention is not limited thereto. For example, one slot can include 7 OFDM symbols in a normal CP case whereas one slot can include 6 OFDM symbols in an extended CP case. Each element in the resource grid is referred to as a resource element (RE). An RB includes 12×7 REs. The number of RBs per downlink slot, $N^{DL}$ depends on downlink transmission bandwidth. An uplink slot structure may correspond to the downlink slot structure.

Figure 3:
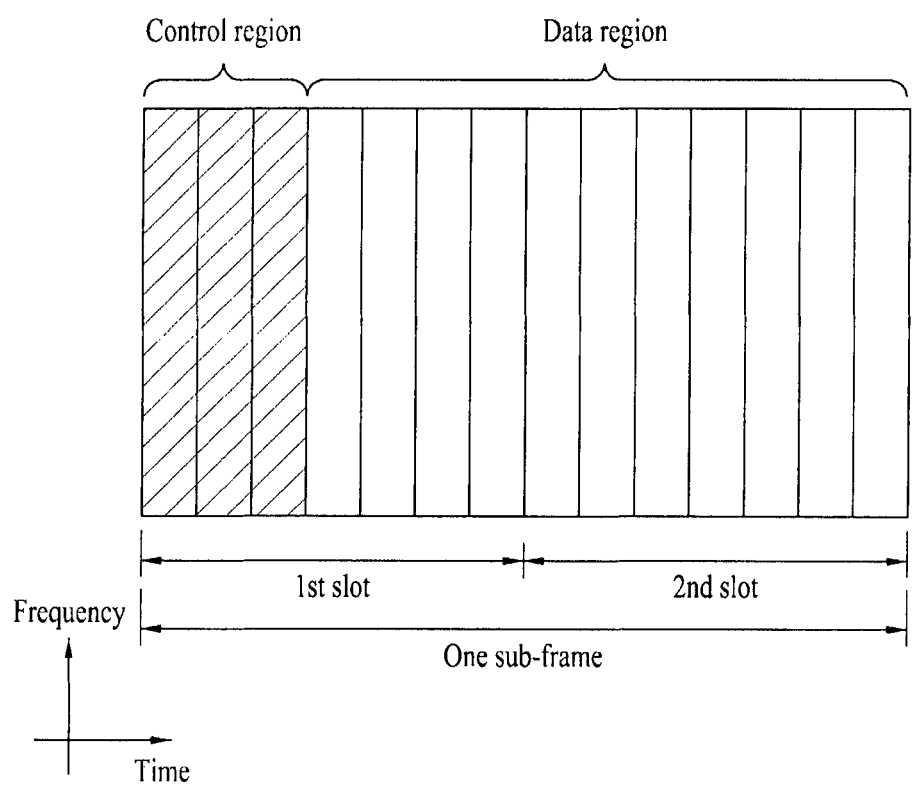
FIG. 3 illustrates a downlink subframe structure.

FIG. 3 illustrates a downlink subframe structure. A maximum of 3 OFDM symbols at the start of a subframe are used for a control region to which a control channel is allocated and the other OFDM symbols of the subframe are used for a data region to which a physical downlink shared channel (PDSCH) is allocated. Downlink control channels used in the 3GPP LTE system include a physical control format indicator channel (PCFICH), a physical downlink control channel (PDCCH), a physical hybrid automatic repeat request indicator channel (PHICH), etc. The PCFICH is transmitted in the first OFDM symbol of a subframe, carrying information about the number of OFDM symbols used for transmission of control channels in the subframe. The PHICH delivers a HARQ ACK/NACK signal in response to an uplink transmission. Control information transmitted on the PDCCH is referred to as downlink control information (DCI). The DCI includes downlink scheduling information or an uplink transmit power control command for an arbitrary UE group. The PDCCH may include resource allocation information and transport format of a downlink shared channel (DL-SCH), resource allocation information and transport format of an uplink shared channel (UP-SCH), paging information of a paging channel (PCH), resource allocation information of a higher layer control message such as a random access response transmitted on a PDSCH, a set of transmit power control commands for an individual UE in an arbitrary UE group, transmit power control information, information on activation of voice over IP (VoIP), etc. A plurality of PDCCHs may be transmitted in a control region. The PDCCH is transmitted as an aggregation of one or more contiguous control channel elements (CCEs). A CCE is a logical allocation unit used to provide a PDCCH at a coding rate based on radio channel state. The CCE corresponds to a plurality of resource element groups. The format and the number of available bits of the PDCCH are determined according to correlation between the number of CCEs and a coding rate provided by the CCEs. An eNB determines a PDCCH format according to DCI transmitted to a UE and adds a cyclic redundancy check (CRC) to the control information. The CRC is masked with an identifier referred to as a radio network temporary identifier (RNTI) according to the owner or purpose of the PDCCH. If the PDCCH is for a specific UE, the CRC can be masked with the cell-RNTI (C-RNTI) of the UE. Otherwise, if the PDCCH is associated with a paging message, the CRC may be masked with a paging indicator identifier (P-RNTI). If the PDCCH relates to system information (more specifically, a system information block (SIB)), the CRC can be masked with a system information identifier and system information RNTI (SI-RNTI). To represent a random access response corresponding to a response to transmission of a random access preamble of a UE, the CRC may be masked with a random access-RNTI (RA-RNTI).

Figure 4:
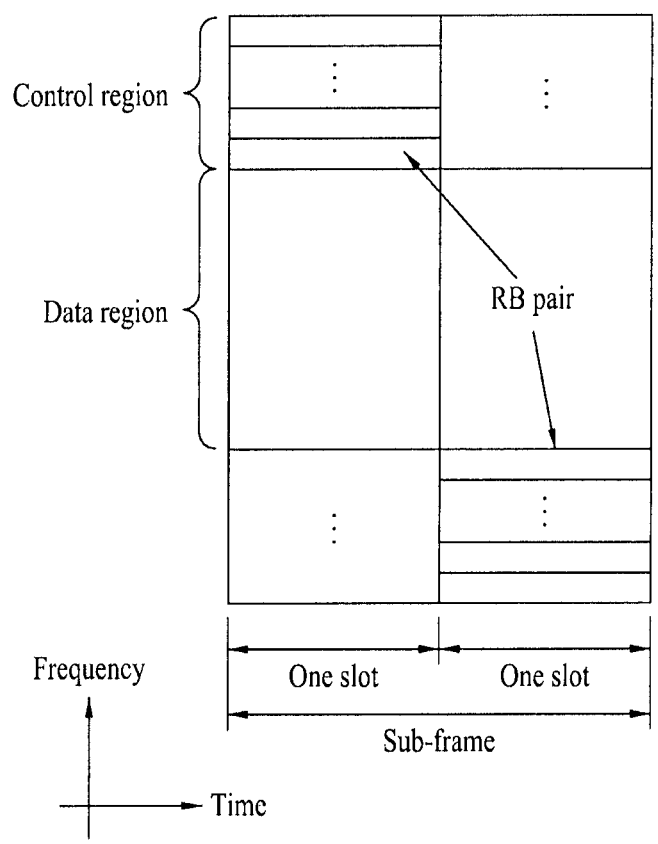
FIG. 4 illustrates an uplink subframe structure.

FIG. 4 illustrates an uplink subframe structure. An uplink subframe may be divided into a control region and a data region in the frequency domain. A physical uplink control channel (PUCCH) carrying uplink control information is allocated to the control region and a physical uplink shared channel (PUSCH) carrying user data is allocated to the data region. To maintain single carrier properties, a UE does not transmit a PUSCH and a PUCCH simultaneously. A PUCCH for a UE is allocated to an RB pair in a subframe. The RBs of the RB pair occupy different subcarriers in two slots. Thus it is said that the RB pair allocated to the PUCCH is frequency-hopped over a slot boundary.

Heterogeneous Deployment

Figure 5:
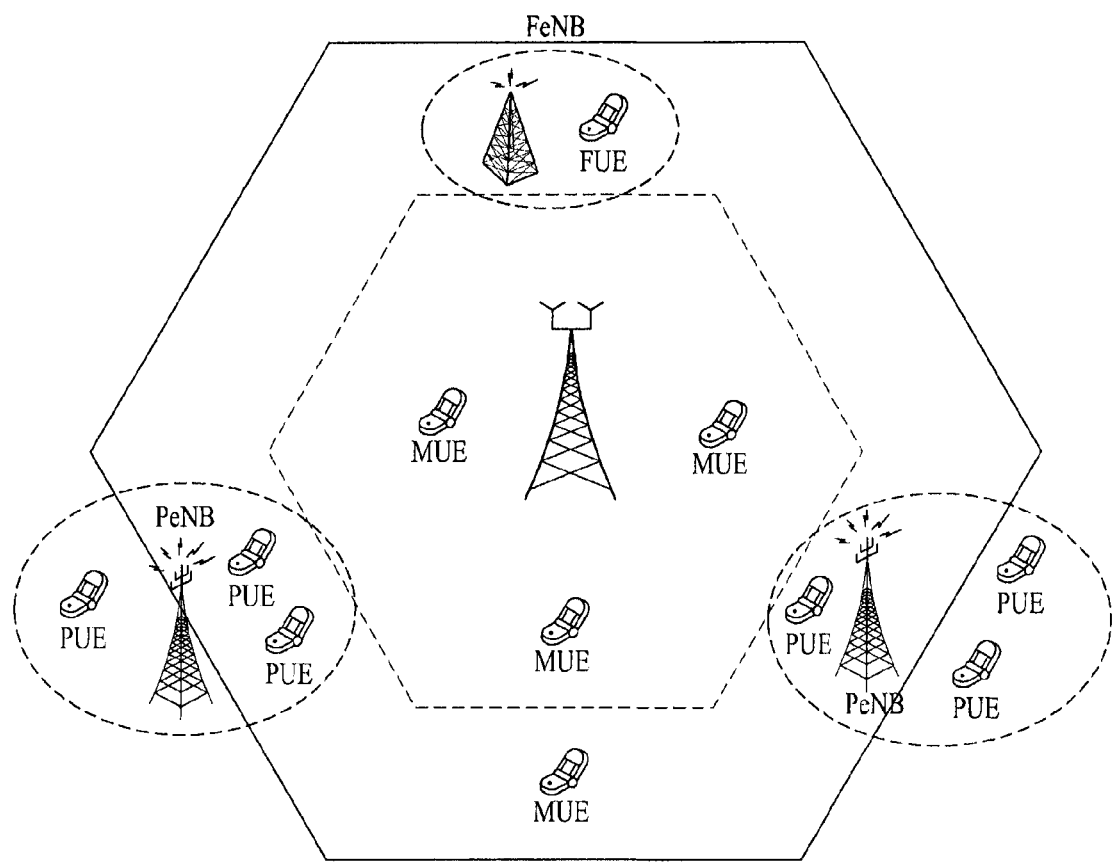
FIG. 5 is a diagram illustrating a heterogeneous network.

FIG. 5 illustrates a heterogeneous network wireless communication system including a macro eNB (MeNB) and micro eNBs (PeNB or FeNB). The term 'heterogeneous network' means a network in which an MeNB and a PeNB or FeNB coexist even when they use the same radio access technology (RAT).

The MeNB is a normal eNB of a wireless communication system having wide coverage and high transmit power. The MeNB may be referred to as a macro cell.

The PeNB or FeNB may be referred to as a micro cell, pico cell, femto cell, home eNB (HeNB), relay, etc. (the exemplified PeNB or FeNB and MeNB may be collectively referred to as transmission points). The PeNB or FeNB, a micro version of the MeNB, can independently operate while performing most functions of the MeNB. The PeNB or FeNB is a non-overlay type eNB that may be overlaid in an area covered by the MeNB or in a shadow area that is not covered by the MeNB. The PeNB or FeNB may cover a smaller number of UEs while having a narrower coverage and lower transmit power compared to the MeNB.

A UE (referred to as a macro-UE (MUE) hereinafter) may be directly served by the MeNB or a UE (referred to as a micro-UE (PUE or FUE) hereinafter) may be served by the PeNB or FeNB. In some cases, a PUE present in the coverage of the MeNB may be served by the MeNB.

The PeNB or FeNB may be classified into two types according to whether UE access is limited.

The first type is an open access subscriber group (OSG) or non-closed access subscriber group (CSG) eNB and corresponds to a cell that allows access of the existing MUE or a PUE of a different PeNB. The existing MUE can handover to the OSG type eNB.

The second type is a CSG eNB which does not allow access of the existing MUE or a PUE of a different PeNB. Accordingly, handover to the CSG eNB is impossible.

Inter-Cell Interference Control (ICIC)

In the heterogeneous network environment as described above, interference between neighboring cells may be a problem. To solve this inter-cell interference, inter-cell interference control (ICIC) may be applied. Conventional ICIC can be applied to frequency resources or time resources.

As exemplary ICIC for the frequency resources, 3GPP LTE release-8 defines a scheme of dividing a given frequency region (e.g. system bandwidth) into one or more sub-regions (e.g. physical resource blocks (PRBs)) and exchanging an ICIC message for each sub-region between cells. For example, relative narrowband transmission power (RNTP) associated with downlink transmission power, UL interference overhead indication (IOI) and UL high interference indication (HII) associated with uplink interference are defined as information included in the ICIC message for the frequency resources.

The RNTP is information indicating downlink transmission power used by a cell that transmits an ICIC message in a specific frequency sub-region. For example, when an RNTP field for a specific frequency sub-region is set to a first value (e.g. 0), this represents that downlink transmission power of a corresponding cell does not exceed a threshold value in the specific frequency sub-region. When the RNTP field for the specific frequency sub-region is set to a second value (e.g. 1), this represents that the corresponding cell cannot guarantee the downlink transmission power in the specific frequency sub-region. In other words, the downlink transmission power of the cell can be regarded as low when the RNTP field is 0, whereas the downlink transmission power of the cell cannot be regarded as low when the RNTP field is 1.

The UL IOI is information indicating the quantity of uplink interference that a cell transmitting an ICIC message suffers in a specific frequency sub-region. For example, when an IOI field for a specific frequency sub-region is set to a value corresponding to a large amount of interference, this represents that a corresponding cell suffers strong uplink interference in the specific frequency sub-region. A cell receiving an ICIC message can schedule UEs using low uplink transmission power from among UEs thereof in a frequency sub-region corresponding to IOI indicating strong uplink interference. Accordingly, UEs can perform uplink transmission with low transmit power in the frequency sub-region corresponding to the IOI indicating strong uplink interference, and thus uplink interference that a neighboring cell (i.e. cell transmitting the ICIC message) suffers can be alleviated.

The UL HII is information indicating a degree of interference (or uplink interference sensitivity) that may be generated for the corresponding frequency sub-region according to uplink transmission in the cell transmitting the ICIC message. For example, when an HII field is set to a first value (e.g. 1) for a specific frequency sub-region, this represents that the cell transmitting the ICIC message may schedule UEs having high uplink transmit power for the specific frequency sub-region. On the contrary, when the HII field is set to a second value (e.g. 0) for the specific frequency sub-region, this represents that the cell transmitting the ICIC message may schedule UEs having low uplink transmission power for the specific frequency sub-region. The cell receiving the ICIC message can avoid interference from the cell transmitting the ICIC message by preferentially scheduling UEs to the frequency sub-region to which the HII field is set to the second value (e.g. 0) and scheduling UEs that can successfully operate even in a strong interference environment to the frequency sub-region to which the HII field is set to the first value (e.g. 1).

As exemplary ICIC for the time resources, 3GPP LTE-A (or 3GPP LTE release-10) defines a scheme of dividing the entire time domain into one or more time sub-regions (e.g. subframes) in the frequency domain and exchanging information on whether silencing is performed on each time sub-region between cells. The cell transmitting the ICIC message may transmit information indicating that silencing is performed in a specific subframe to neighboring cells and does not schedule schedule a PDSCH or a PUSCH in the specific subframe. The cell receiving the ICIC message may schedule uplink and/or downlink transmission for UEs on the subframe in which silencing is performed in the cell transmitting the ICIC message.

Figure 6:
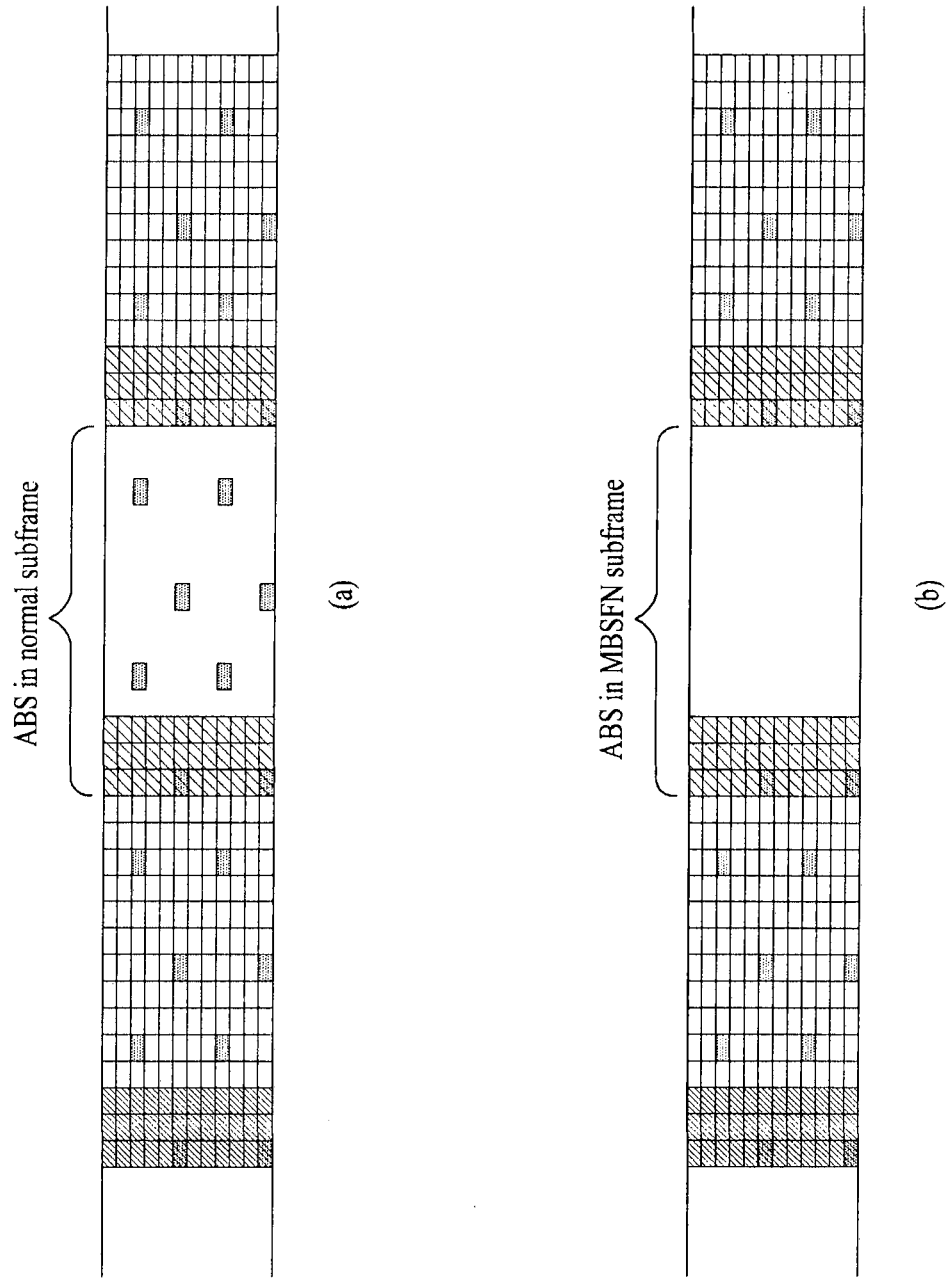
FIG. 6 is a diagram illustrating an ABS.

Silencing may represent an operation in which a specific cell does not transmit signals (or transmits zero power or weak power) in a specific subframe on uplink and downlink. As an example of silencing, a specific cell can set a specific subframe as an almost blank subframe (ABS). There are two types of ABS, as shown in FIG. 6. Specifically, one type is an ABS in a normal subframe in which a data region is vacant while a CRS is transmitted, as shown in FIG. 6(a) and the other type is an ABS in an MBSFN subframe in which even a CRS is not transmitted.

Since a slight influence of interference due to a CRS may exist in the ABS in normal subframe, the ABS in the MBSFN subframe is advantageous in terms of interference. However, the ABS in the MBSFN subframe is restrictively used. That is, setting an MBSFN subframe to an ABS is restricted in subframes for system information and synchronization signal transmission. More specifically, it is difficult to set an MBSFN subframe to an ABS in subframes #0, #4, #5 and #9 for transmitting a physical broadcast channel (PBCH) carrying a master information block (MIB) including systems information, a primary synchronization signal (PSS) transmitted for cell search, a secondary synchronization signal (SSS), and paging and system information block 1 (SIB1) in the case of FDD. In TDD, it is impossible to set an MBSFN to an ABS in subframes #0, #1, #5 and #6 for the same reason.

Setting most MBSFN subframes to ABSs may deteriorate system efficiency due to waste of radio resources. Furthermore, when MBSFN subframes are set for other purposes, this also limits ABS configuration.

Figure 7:
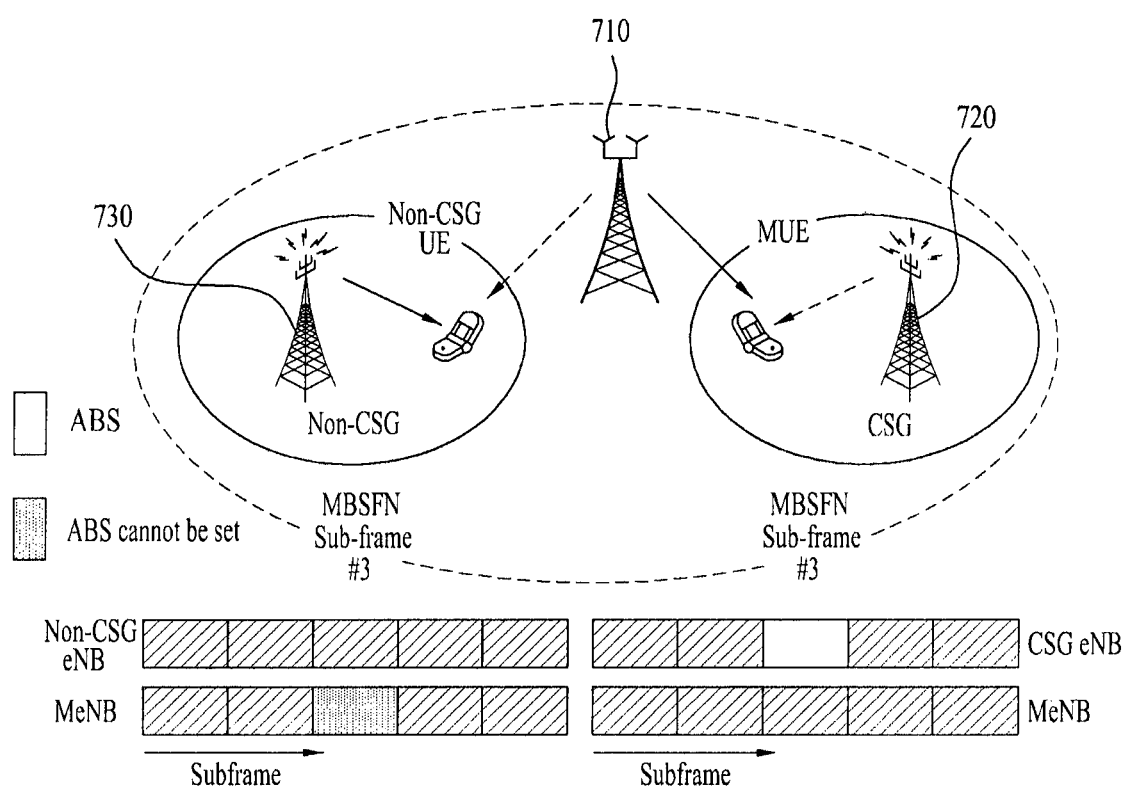
FIG. 7 is a diagram illustrating interference that may be generated in a heterogeneous network environment.

The aforementioned limitation in setting an MBSFN subframe also occurs in a heterogeneous network environment in which different types of transmission points coexist, as shown in FIG. 7.

FIG. 7 illustrates a method for reducing interference by setting an ABS in a heterogeneous network environment. Referring to FIG. 7, the heterogeneous network environment includes a first transmission point 710 corresponding to a macro eNB MeNB, a second transmission point 720 corresponding to a micro eNB and CSG eNB, a third transmission point 730 corresponding to a micro eNB and non-CSG eNB, a first UE MUE served by the first transmission point, and a second UE Non-CSG UE belonging to the third transmission point. In this environment, interference is applied to the first UE between the first transmission point and the second transmission point. Specifically, interference from a signal (dotted line) transmitted from the second transmission point to the UE that belongs to the second transmission point is applied to the first UE provided with a service from the first transmission point when the first UE receives a downlink signal (solid line) from the first transmission point. Similarly, interference from the first transmission point is applied to the second UE when the second UE receives a downlink signal (solid line) from the third transmission point to which the second UE belongs.

To solve the aforementioned interference problem, an ABS may be set as follows. As shown in the bottom part of FIG. 7, subframe #3 may be set to an ABS to reduce interference applied to the first UE from the second transmission point. In this case, the first transmission point can schedule the first UE for subframe #3 set by the second transmission point to the ABS. However, interference applied to the second UE cannot be considered in this case. That is, although the first transmission point can schedule the first UE for subframe #3 set by the second transmission point to the ABS and smoothly provide a service to the first UE, it is impossible to set subframe #3 to an ABS for the second UE (particularly, it is impossible to set an MBSFN subframe to an ABS). Accordingly, the second UE still receives interference from the first transmission point, and thus use of MBSFN subframes is restricted and system performance is deteriorated.

In the above-described heterogeneous network environment, the second UE may shift a subframe to reduce interference applied to both the first UE and the second UE, which is described with reference to FIG. 8.

Figure 8:
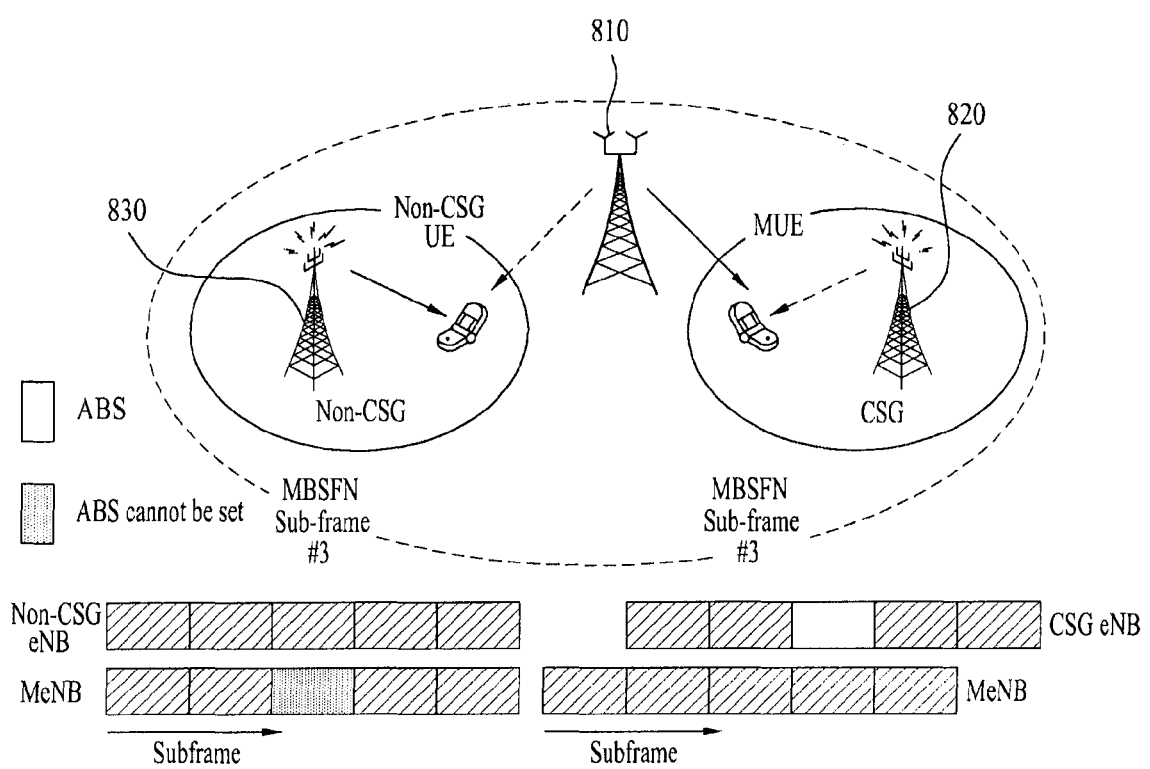
FIG. 8 is a diagram illustrating mitigation of the influence of interference through subframe shift in a heterogeneous network environment according to an embodiment of the present invention.

FIG. 8 is a diagram illustrating a method for reducing the influence of interference through subframe shift in a heterogeneous network environment according to an embodiment of the present invention. Referring to FIG. 8, the second transmission point sets subframe #3 to an ABS and, simultaneously, shifts the subframe by one such that interference is not applied to the first UE. In this case, the first transmission point can set subframe #3, set by the second transmission point to the ABS, to an ABS for the second UE. Accordingly, it is possible to mitigate interference by setting ABSs for both the first UE and the second UE in the heterogeneous network environment.

Methods for reducing interference in a heterogeneous network environment through subframe shift and ABS configuration as described above will now be described in detail. Since it is advantageous to set an MBSFN subframe to an ABS rather than setting a normal ABS to an ABS because the MBSFN subframe can even reduce the influence of a CRS, as described above, the following description focuses on maximizing the number of MBSFN subframes that can be set to ABSs in a heterogeneous network environment similar to what is shown in Table 7. In addition, subframe shift may be performed on a subframe basis or on a radio frame (corresponding to 10 subframes) basis in embodiments of the present invention, which are respectively described below.

FIG. 9 is a diagram illustrating mitigation of interference through subframe-based shift according to an embodiment of the present invention. FIG. 9(a) illustrates a case in which subframe-based shift is not applied, FIG. 9(b) illustrates a case in which one subframe is shifted, and FIG. 9(c) illustrates a case in which two subframes are shifted. In FIG. 9, transmission points correspond to the transmission points shown in FIGS. 7 and 8 on the assumption that the transmission points are present in the above-described heterogeneous network environment and FDD is used.

Referring to FIG. 9(a), the second transmission point can set subframes other than subframes #0, #4, #5 and #9 to MBSFN subframes. For example, the second transmission point sets subframes #1, #3 and #7 in the first radio frame and subframes #2 and #8 in the second radio frame to ABSs for the first UE belonging thereto. In addition, subframe #4 that is difficult to be set to an MBSFN subframe in each radio frame is also set to an ABS. In this case, the first transmission point cannot set subframes corresponding to subframes (i.e. subframes #1, #3 and #7 in the first radio frame and subframes #2 and #8 in the second radio frame), which are set to ABSs by the second transmission points, to ABSs for the second UE belonging to the third transmission point. That is, setting the 5 MBSFN subframes to ABSs is limited by ABS configuration of the second transmission point. Furthermore, setting subframes #0, #4, #5 and #9 to MBSFN subframes is limited because subframes #0, #4, #5 and #9 are used to transmit a synchronization signal and system information. Accordingly, the first transmission point can set a total of 7 MBSFN subframes (subframes #2, #6 and #8 in the first radio frame and subframes #1, #3, #6 and #7 in the second radio frame) in 2 radio frames to ABSs for the second UE belonging to the third transmission point.

FIG. 9(b) illustrates a method for securing more MBSFN subframes that can be set to ABSs by shifting one subframe based on ABS configuration of the second transmission point, shown in FIG. 9(a). Specifically, the second transmission point shifts one subframe, and thus 3 subframes, that is, subframes #2 and #8 in the first radio frame and subframe #3 in the second radio frame cannot be set to MBSFN subframes by the second transmission point. When subframes #0, #4, #5 and #9 that are difficult to be set to MBSFN subframes are excluded, the number of MBSFN subframes that can be set to ABSs by the first transmission point increases to 9 (subframes #1, #3, #6 and #7 in the first radio frame and subframes #1, #2, #6, #7 and #8 in the second radio frame). Two more MBSFN subframes can be set to ABSs for the second UE, compared to the case in which subframe shift is not applied, shown in FIG. 9(a).

FIG. 9(c) illustrates a method for securing more MBSFN subframes that can be set to ABSs by shifting two subframes based on ABS configuration of the second transmission point, shown in FIG. 9(a).

In this case, the first transmission point can set a total of 9 subframes (subframes #1, #2, #7 and #8 in the first radio frame and subframes #1, #2, #3, #7 and #8 in the second radio frame) to ABSs for the second UE belonging to the third transmission point.

As described above, the first transmission point can set ABSs for the second UE belonging to the third transmission point in consideration of restriction by ABS configuration of the second transmission point and other restrictions according to transmission of system information, etc. Here, the first transmission point may set ABSs such that the number of MBSFN subframes that can be set to ABSs, which varies with shift value, is maximized. However, when the second transmission point shifts too many subframes, the number of MBSFN subframes may be determined in consideration of service delay for UEs belonging to the second transmission point.

Figure 10:
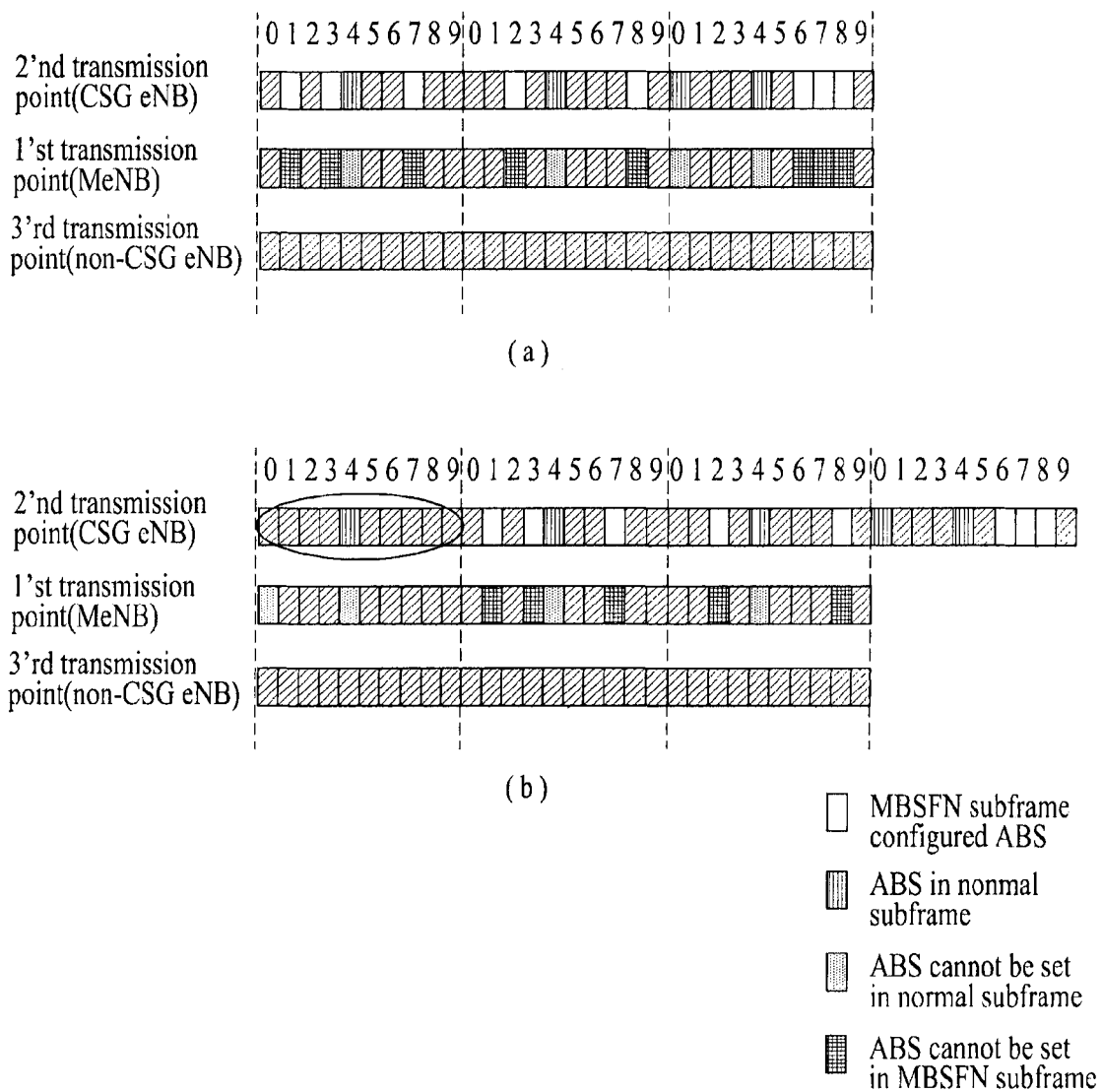
FIGS. 10 and 11 are diagrams illustrating mitigation of interference through radio frame-based shift according to an embodiment of the present invention.
Figure 11:
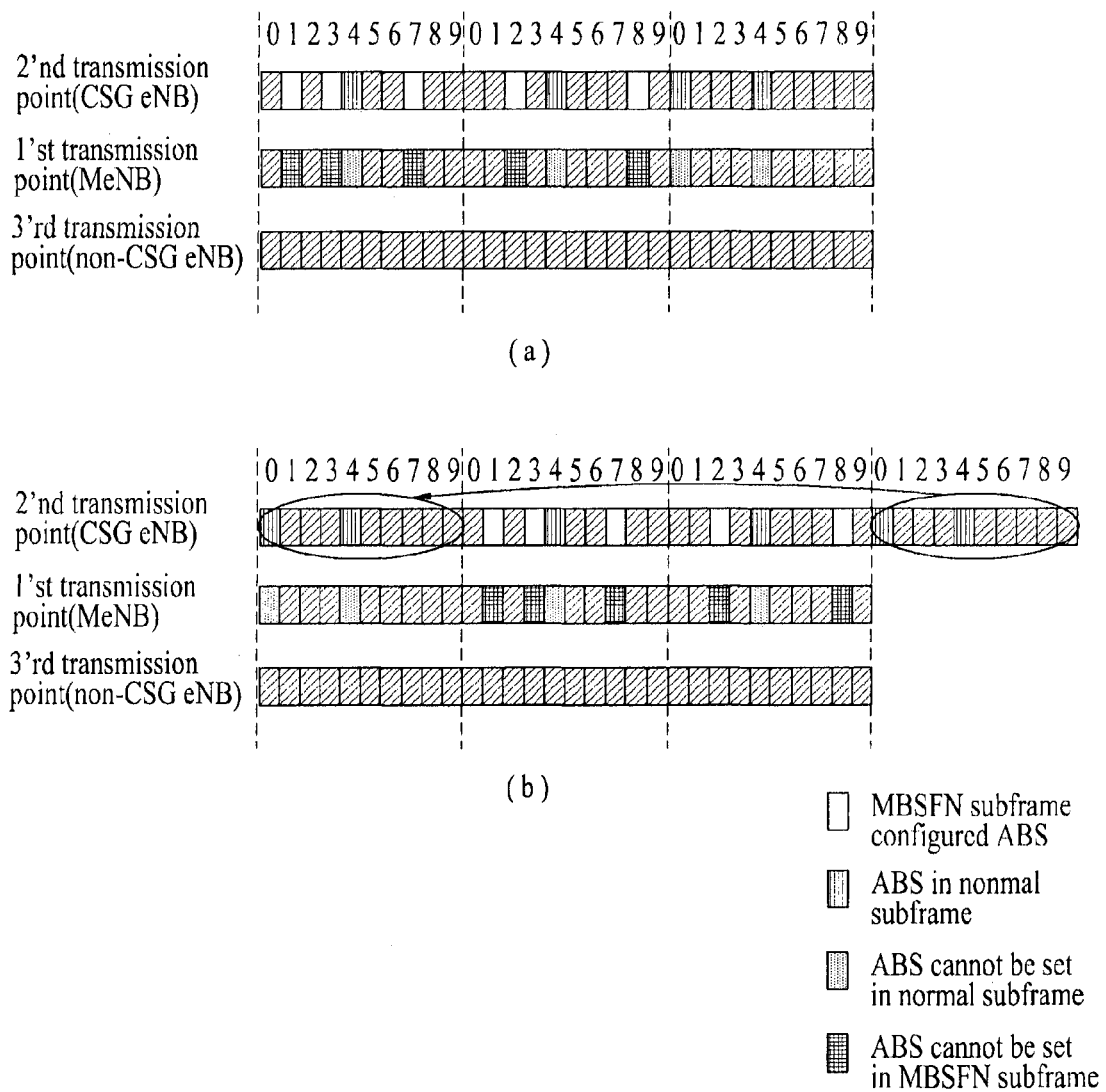

FIGS. 10 and 11 are diagrams illustrating mitigation of interference through radio frame based shift according to embodiments of the present invention. Following embodiments is a method by using a property that an ABS period is fixed (40 ms in FDD and 70 ms in TDD).

It can be seen from FIG. 10(*a*) that the second transmission point sets subframes #1, #3, #4 and #7 in the first radio frame, subframes #2, #4 and #8 in the second radio frame and subframes #0, #4, #6, #7 and #8 in the third radio frame to ABSs. In this case; the first transmission point cannot use the subframes set by the second transmission point to ABSs as MBSFN subframes that can be set to ABSs. This is because the first transmission point schedules subframes corresponding to the subframes, set by the second transmission point to ABSs, for the first UE belonging thereto. The first transmission point cannot set a total of 8 MBSFN subframes (subframes #1, #3 and #7 in the first radio frame, subframes #2 and #8 in the second radio frame and subframes #6, #7 and #8 in the third radio frame) to ABSs because of ABS setting of the second transmission point. Here, when subframes #0. #4, #5 and #9 are excluded, the first transmission point can set a maximum of 10 MBSFN subframes to ABSs for the UE (second UE) belonging to the third transmission point if there is no particular reason.

FIG. 10(*b*) illustrates an example of increasing the number of MBSFN subframes that can be set by the first transmission point to ABSs by shifting one radio frame. More specifically, when the second transmission point shifts one radio frame, the first transmission point cannot set 5 subframes (subframes #1, #3 and #7 in the second radio frame and subframes #2 and #8 in the third radio frame) to ABSs according to ABS setting of the second transmission point. In this case, the number of MBSFN subframes that can be set by the first transmission point to ABSs increases to 13 (subframes #1, #2, #3, #6, #7 and #8 in the first radio frame, subframes #2, #6 and #8 in the second radio frame and subframes #1, #3, #6 and #7 in the third radio frame).

Referring to FIG. 11, the second transmission point shifts one radio frame on the assumption that the ABS period is 30 ms. Here, radio frame shift may be regarded as cyclic shift on a radio frame basis.

It can be seen from FIG. 11(*a*) that the second transmission point sets subframes #1, #3, #4 and #7 in the first radio frame, subframes #2, #4 and #8 in the second radio frame and subframes #0 and #4 in the third radio frame to ABSs. Accordingly, a total of 5 MBSFN subframes cannot be set by the first transmission point to ABSs. A maximum of 13 MBSFN subframes can be set by the first transmission point to ABSs.

FIG. 11(*b*) illustrates a case in which one radio frame is shifted. In this case, the number of MBSFN subframes that cannot be set by the first transmission point to ABSs is 5 and a maximum number of MBSFN subframes that can be set by the first transmission point to ABSs is 13. The scheme shown in FIG. 11(*b*) is useful when it is necessary to set many ABSs in a specific radio frame while the maximum number of MBSFN subframes that can be set to ABSs through radio frame shift is fixed. That is, when it is necessary to set many ABSs in the first radio frame in the case of FIG. 11(*a*), this can be achieved through one radio frame shift (cyclic shift) as shown in FIG. 11(*b*).

While the aforementioned subframe based shift or radio frame based shift is performed in the heterogeneous network environment including a macro eNB, a CSG eNB and a non-CSG eNB, the present invention is not limited thereto and can be extended and applied to various scenarios. Furthermore, interference from system information such as SIB-1 located in the fifth subframe of an even-numbered radio frame of a conventional control channel may be solved an odd number of radio frame shifts. That is, the radio frame shift may be combined with a subframe shift scheme for avoiding interference in the conventional control channel. While the above embodiments focuses on MBSFN subframes, the present invention is not limited thereto and restriction on use of ABSs of a macro eNB can be solved even in a case in which a CSG eNB sets most subframes in a specific radio frame to ABSs due to service for a small number of UEs.

In the above-described embodiments, the first transmission point may determine the number of subframes or radio frames that need to be shifted by the second transmission point.

Specifically, the first transmission point can receive ABS configuration information of the second transmission point, and then determine the number of subframes or radio frames that need to be shifted by the second transmission point. Here, the ABS configuration information of the second transmission point may be in a bitmap form and may be transmitted to the first transmission point using a backhaul or relay.

Alternatively, the first transmission point may receive the ABS configuration information of the second transmission point and/or a recommended shift value from the second transmission point and determine the number of subframes or radio frames that need to be shifted by the second transmission point. The recommended shift value may be the subframe or radio frame upper limit, lower limit, or a range specified by the upper limit and lower limit. The first transmission point may determine the number of subframes or radio frames that need to be shifted by the second transmission point according to the recommended shift value received from the second transmission point through a backhaul or the like, or determine a shift value in consideration of states of other transmission points without using the recommended shift value. If the first transmission point determines the number of subframes or radio frames without using the recommended shift value, it is necessary to additionally signal the determined shift value to the second transmission point.

Furthermore, the first transmission point may determine the shift value by receiving the ABS configuration information of the second transmission point and/or a value that the second transmission point does not want to determine as the shift value from the second transmission point.

Figure 12:
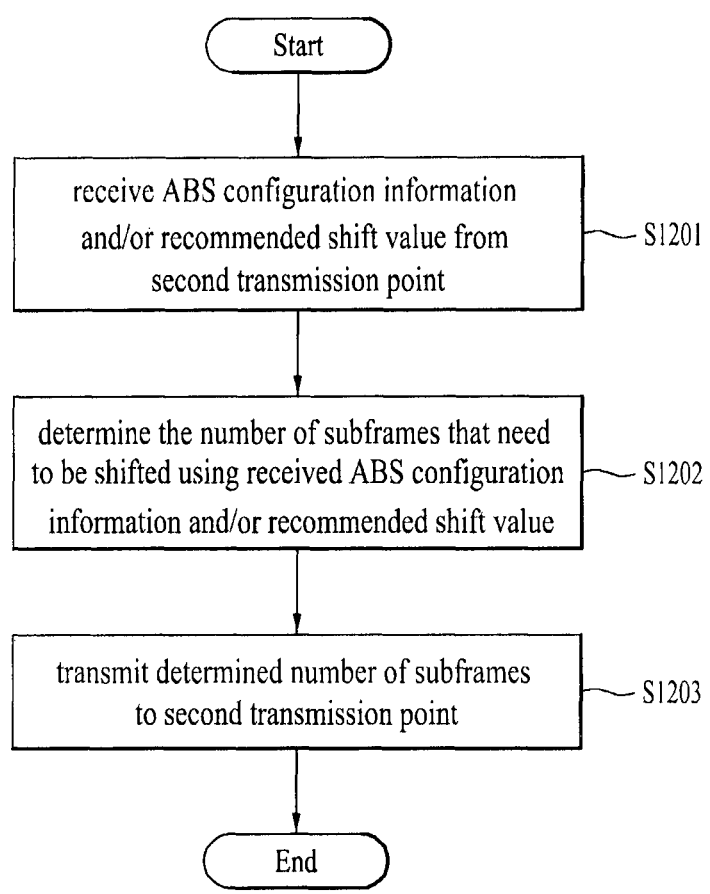
FIG. 12 is a flowchart illustrating a shift value determination procedure according to an embodiment of the present invention.

FIG. 12 is a flowchart illustrating the aforementioned shift value determination procedure. Referring to FIG. 12, the first transmission point receives the ABS configuration information and/or recommended shift value from the second transmission point (S1201) and determines the number of subframes or radio frames that need to be shifted by the second transmission point on the basis of the received ABS configuration information and/or recommended shift value (S1202). The determined number of subframes or radio frames is transmitted to the second transmission point (S1203) such that the second transmission point uses the shift value.

When the heterogeneous network environment includes a large number of low-power transmission points such as non-CSG, CSG, etc., a macro eNB may shift frames. If the eNB cannot sufficiently mitigate interference through frame shift, specific transmission points can complement insufficient interference mitigation through frame shift.

Figure 13:
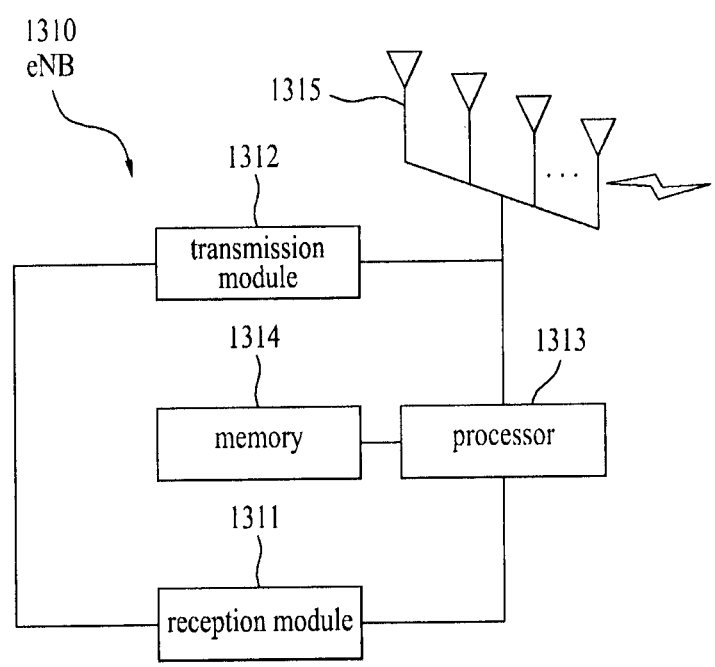
FIG. 13 illustrates a configuration of a transmission/reception apparatus.

FIG. 13 illustrates a configuration of a transmission point apparatus according to an embodiment of the present invention.

Referring to FIG. 13, a transmission point apparatus 1310 according to an embodiment of the present invention may include a reception module 1311, a transmission module 1312, a processor 1313, a memory 1314, and a plurality of antennas 1315. The plurality of antennas 1315 represents that the transmission point apparatus 1310 supports MIMO transmission/reception. The reception module 1311 may receive signals, data and information from a UE on uplink. The transmission module 1312 may transmit signals, data and information to the UE on downlink. The processor 1313 may control the overall operation of the transmission point apparatus 1810.

The processor 1313 of the transmission point apparatus 1310 may determine the number of subframes that need to be shifted at a second transmission point using information received from the second transmission point for an ABS configuration. The ABS configuration may be set for a UE belonging to a third transmission point.

The processor 1313 of the transmission point apparatus 1310 may process information received by the transmission point apparatus 1310, information to be transmitted to the outside, etc. The memory 1314 may store the processed information for a predetermined time and may be replaced by a component such as a buffer (not shown).

The detailed configuration of the transmission point apparatus may be implemented such that the aforementioned embodiments of the present invention can be independently applied thereto or two or more embodiments can be simultaneously applied thereto, description of redundant parts is omitted for clarity.

Description of the transmission point apparatus 1310 in FIG. 13 may be equally applied to a relay as a downlink transmitter or an uplink receiver.

The embodiments of the present invention may be achieved by various means, for example, hardware, firmware, software, or a combination thereof.

In a hardware configuration, the methods according to the embodiments of the present invention may be achieved by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, microprocessors, etc.

In a firmware or software configuration, the embodiments of the present invention may be implemented in the form of a module, a procedure, a function, etc. For example, software code may be stored in a memory unit and executed by a processor. The memory unit is located at the interior or exterior of the processor and may transmit and receive data to and from the processor via various known means.

Those skilled in the art will appreciate that the present invention may be carried out in other specific ways than those set forth herein without departing from the spirit and essential characteristics of the present invention. The above embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein. It is obvious to those skilled in the art that claims that are not explicitly cited in each other in the appended claims may be presented in combination as an exemplary embodiment of the present invention or included as a new claim by a subsequent amendment after the application is filed.

INDUSTRIAL APPLICABILITY

The above-described embodiments of the present invention can be applied to various mobile communication systems.

The invention claimed is:

1. A method for mitigating interference in a wireless communication system, the method comprising:
   determining, by a first transmission point (TP) capable of configuring a first Almost Blank Subframe (ABS) pattern, a number (N) of subframes that are to be shifted in a second ABS pattern of a second TP; and
   transmitting the number N by the first TP to the second TP,
   wherein N is determined to maximize a number (K) of Multimedia Broadcast multicast service Single Frequency Network (MBSFN) subframes that can be set to ABSs of the first ABS pattern, and
   wherein the ABSs of the first ABS pattern do not overlap in the time domain with ABSs of the second ABS pattern.

2. The method according to claim 1,
   wherein the first ABS pattern is for mitigating interference between the first TP and a third TP,
   wherein the second ABS pattern is for mitigating interference between the first TP and the second TP.

3. The method according to claim 1, wherein N is determined by considering the ABSs of the second ABS pattern and MBSFN subframes of the first TP.

4. The method according to claim 1, further comprising:
   scheduling, by the first TP, one or more user equipments (UEs) in subframes corresponding to the ABSs of the second ABS pattern.

5. The method according to claim 1, wherein the second ABS pattern is shifted as cyclic shift by a radio frame basis.

6. The method according to claim 1, further comprising:
   receiving the second ABS pattern by the first TP from the second TP.

7. The method according to claim 1, wherein the second ABS pattern is represented as a bitmap, each bit of the bitmap indicating whether or not a corresponding subframe is set as an ABS.

8. The method according to claim 1, further comprising:
   receiving, by the first TP, a recommended value of N from second TP.

9. The method according to claim 8, wherein the recommended value of N includes at least one of an upper limit or lower limit in subframe unit or radio frame unit.

10. The method according to claim 1, wherein the second ABS lasts for a predetermined time.

11. The method according to claim 2, wherein the first TP is a macro eNB and the second TP is a closed access subscriber group (CSG) eNB, and the third TP is a non-CSG eNB.

12. A method for mitigating interference in a wireless communication system, the method comprising:
    transmitting, to a first transmission point (TP) by a second TP, a second Almost Blank Subframe (ABS) pattern of the second TP; and
    receiving, by the second TP from the first TP, a number (N) of subframes that are to be shifted in the second ABS pattern,
    wherein N is determined to maximize a number (K) of Multimedia Broadcast multicast service Single Frequency Network (MBSFN) subframes that can be set to ABSs of a first ABS pattern configured by the first TP, and
    wherein the ABSs of the first ABS pattern do not overlap in the time domain with ABSs of the second ABS pattern.

13. A first transmission point (TP) capable of configuring a first Almost Blank Subframe (ABS) pattern in a wireless communication system, the first TP comprising:
    a transmitter; and
    a processor operatively connected to the transmitter and configured to:
    determine a number (N) of subframes that are to be shifted in a second ABS pattern of a second TP; and
    transmit the number N to the second TP, wherein N is determined to maximize a number (K) of Multimedia Broadcast multicast service Single Frequency Network (MBSFN) subframes that can be set to ABSs of the first ABS pattern, and wherein the ABSs of the first ABS pattern do not overlap in the time domain with ABSs of the second ABS pattern.

14. A second transmission point (TP) in a wireless communication system, the second TP comprising:

a receiver;

a transmitter; and a processor operatively connected to the receiver and the transmitter, the processor configured to:

transmit, to a first transmission point (TP), a second Almost Blank Subframe (ABS) pattern of the second TP; and receive, from the first TP, a number (N) of subframes that are to be shifted in the second ABS pattern, wherein N is determined to maximize a number (K) of Multimedia Broadcast multicast service Single Frequency Network (MBSFN) subframes that can be set to ABSs of a first ABS pattern configured by the first TP, and wherein the ABSs of the first ABS pattern do not overlap in the time domain with ABSs of the second ABS pattern.

* * * * *